(12) United States Patent
Eslami

(10) Patent No.: US 10,902,680 B2
(45) Date of Patent: Jan. 26, 2021

(54) AUGMENTED REALITY APPLICATION SYSTEM AND METHOD

(71) Applicant: Saeed Eslami, Gilbert, AZ (US)

(72) Inventor: Saeed Eslami, Gilbert, AZ (US)

( * ) Notice: Subject to any disclaimer, the term of this patent is extended or adjusted under 35 U.S.C. 154(b) by 0 days.

(21) Appl. No.: 16/366,238

(22) Filed: Mar. 27, 2019

(65) Prior Publication Data

US 2019/0304195 A1 Oct. 3, 2019

Related U.S. Application Data

(60) Provisional application No. 62/652,292, filed on Apr. 3, 2018.

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01); *G06T 19/003* (2013.01); *G06T 2210/04* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 7,522,186 B2* | 4/2009 | Arpa | ..................... | G06T 15/205 348/143 |
| 7,564,469 B2 | 7/2009 | Cohen | | |
| 7,663,649 B2* | 2/2010 | Takemoto | ............. | G06T 19/006 345/633 |
| 8,882,591 B2* | 11/2014 | Kawamoto | ........... | G06T 19/006 463/31 |
| 8,922,588 B2* | 12/2014 | Makino | .................. | G06T 19/006 345/473 |
| 9,674,504 B1* | 6/2017 | Salvagnini | ............ | G01S 7/4972 |
| 9,754,167 B1* | 9/2017 | Holz | ..................... | G06T 19/006 |
| 9,864,909 B2 | 1/2018 | Bare et al. | | |
| 2004/0109009 A1* | 6/2004 | Yonezawa | ............... | G06T 15/20 345/632 |
| 2005/0052462 A1* | 3/2005 | Sakamoto | .......... | G01C 21/3694 345/473 |
| 2007/0008341 A1* | 1/2007 | Endo | ........................ | G06T 11/60 345/633 |
| 2008/0024597 A1* | 1/2008 | Yang | .................... | H04N 13/344 13/344 |
| 2009/0109240 A1* | 4/2009 | Englert | ..................... | G06T 7/73 345/633 |

(Continued)

*Primary Examiner* — Martin Mushambo
(74) *Attorney, Agent, or Firm* — Charles Runyan; Runyan Law

(57) ABSTRACT

An augmented reality application system for use on a wireless device. The system is configured to allow a user to view a three-dimensional model and existing hardscape in real-time, simultaneously. The remote connection of the system preferably includes the capabilities to transmit data to a third party. The system also preferably includes the capabilities to measure relative distances between objects in the model and in reality, via the user interface as well as distances between two objects in the model or two existing objects. Additionally, the system includes a model that is separable into different layers such that the user is able to view selected types of facilities contained within the model and sections of the model A method of use is also disclosed.

17 Claims, 11 Drawing Sheets

(56) References Cited

U.S. PATENT DOCUMENTS

| | | | |
|---|---|---|---|
| 2010/0159434 A1 | 6/2010 | Lampotang et al. | |
| 2011/0169861 A1* | 7/2011 | Suzuki | G06T 19/006 345/632 |
| 2011/0237331 A1* | 9/2011 | Doucet | A63F 13/10 463/32 |
| 2012/0075285 A1* | 3/2012 | Oyagi | A63F 13/424 345/419 |
| 2012/0086729 A1* | 4/2012 | Baseley | G06T 19/006 345/633 |
| 2012/0218257 A1* | 8/2012 | Hisano | G06T 19/006 345/419 |
| 2013/0093788 A1* | 4/2013 | Liu | H04N 5/272 345/633 |
| 2013/0148851 A1* | 6/2013 | Leung | G06K 9/3241 382/103 |
| 2013/0300830 A1* | 11/2013 | Solem | G06T 7/74 348/46 |
| 2014/0176609 A1* | 6/2014 | Gotoda | G02B 27/017 345/633 |
| 2014/0247279 A1* | 9/2014 | Nicholas | G06T 19/006 345/633 |
| 2014/0247280 A1* | 9/2014 | Nicholas | G06F 3/011 345/633 |
| 2014/0282911 A1* | 9/2014 | Bare | H04W 64/003 726/4 |
| 2014/0333665 A1* | 11/2014 | Sylvan | G06F 3/013 345/633 |
| 2014/0375684 A1* | 12/2014 | Algreatly | G06T 7/344 345/633 |
| 2015/0049081 A1* | 2/2015 | Coffey | G06K 9/4604 345/419 |
| 2015/0049201 A1* | 2/2015 | Liu | H04N 5/7491 348/189 |
| 2015/0347854 A1* | 12/2015 | Bare | G06K 9/00671 345/633 |
| 2015/0363966 A1* | 12/2015 | Wells | G06F 3/017 345/419 |
| 2015/0371449 A1 | 12/2015 | Cespedes Narbona et al. | |
| 2016/0019721 A1 | 1/2016 | Bare et al. | |
| 2016/0026253 A1* | 1/2016 | Bradski | H04N 13/344 13/344 |
| 2016/0067593 A1* | 3/2016 | Yim | A63F 13/25 463/31 |
| 2016/0080732 A1* | 3/2016 | Pedley | G02B 27/017 345/8 |
| 2016/0124502 A1* | 5/2016 | Sawyer | G02B 27/017 345/633 |
| 2017/0061696 A1* | 3/2017 | Li | G02B 27/017 |
| 2017/0371153 A1* | 12/2017 | Hidaka | G01B 11/24 |
| 2018/0005457 A1* | 1/2018 | Qin | G01S 17/50 |
| 2018/0088185 A1* | 3/2018 | Woods | G01R 35/00 |
| 2018/0122043 A1* | 5/2018 | Energin | G06T 3/20 |
| 2018/0124375 A1* | 5/2018 | Rousseau | H04N 13/144 |
| 2018/0150186 A1* | 5/2018 | Norieda | G06F 3/014 |
| 2018/0247456 A1* | 8/2018 | Tuo | G06T 7/00 |
| 2019/0035124 A1* | 1/2019 | Kapinos | G06T 3/40 |
| 2019/0035125 A1* | 1/2019 | Bellows | G06T 11/60 |
| 2019/0043259 A1* | 2/2019 | Wang | H04N 13/25 |
| 2019/0065027 A1* | 2/2019 | Hauenstein | G06F 3/017 |
| 2019/0094981 A1* | 3/2019 | Bradski | G02B 27/0093 |
| 2019/0126139 A1* | 5/2019 | Goslin | A63F 13/211 |
| 2019/0180082 A1* | 6/2019 | Moravec | G06T 7/70 |

* cited by examiner

AUGMENTED REALITY APPLICATION SYSTEM AND METHOD

CROSS-REFERENCE TO RELATED APPLICATION(S)

The present application is related to and claims priority to U.S. Provisional Patent Application No. 62/652,292 filed Apr. 3, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of computer graphics processing and selective visual display systems of existing art and more specifically relates to placing generated data in a real scene.

RELATED ART

Augmented reality, which may be referred to as "AR", is a live view of a physical and real-world environment whose elements are augmented or supplemented by computer-generated information. The overlaid visual information may be constructive or destructive. AR may include masking of the natural environment, such as adding or removing the natural information. In this way, augmented reality can alter a user's current aspects of a real world environment.

The primary value of augmented reality is to bring components of the digital world into the user's perception of the real world. The first commercial augmented reality experiences were used largely in the entertainment and gaming businesses. Augmented reality may be used to enhance the natural environments or situations and offer perceptually enriched experiences. Information about the environment and its objects is overlaid on the real world.

One such limitation with augmented reality is that the technology is limited to a device or other similar device and is dedicated to one user. Current model files are very large and take large processing capability to display which is undesirable. Therefore, a suitable solution is desired wherein the technology can be conveniently used for an array of applications and on a non-dedicated device.

U.S. Pat. No. 9,864,909 to Brian Bar, et al. relates to a system and method for using augmented reality display in surface treatment procedures. The described system and method for using augmented reality display in surface treatment procedures includes a method for providing target object surface information to a mobile device user. The method includes receiving a request for target object surface information from a mobile device, determining the pose of the mobile interface device relative to the target object, and obtaining target object surface information for one or more measurable target object surface parameters. The target object data is used to assemble augmented reality surface information configured for viewing in conjunction with a real-time view of the target object captured by the mobile interface device. The target object augmented reality surface information is then transmitted to the mobile device for display to the user.

SUMMARY OF THE INVENTION

In view of the foregoing disadvantages inherent in the known placing of generated data in a real scene means art, the present disclosure provides a novel augmented reality application system and method. The general purpose of the present disclosure, which will be described subsequently in greater detail, is to provide an efficient and effective augmented reality application system and method.

An augmented reality application system is disclosed herein. The augmented reality application system preferably includes use on a wireless device. The wireless device preferably includes a remote connection (e.g., cellular, short range radio protocol, etc.), an internal memory, at least one gyroscopic sensor (the at least one gyroscopic sensor includes capabilities to determine a vertical axis and a horizontal axis), a camera, a visual output, and a global positioning unit. The system is operable via a dedicated headset, in the preferred embodiment. The wireless device preferably includes the capability to read a data-marker.

The internal memory includes a three-dimensional model related to a construction design or construction modifications. Further, the augmented reality system is preferably configured to allow a user to view the three-dimensional model as well as an existing hardscape simultaneously and in real-time. Existing hardscape may be incorporated into the model, in separate layers.

The remote connection of the system preferably includes the capabilities to transmit data to a third party (e.g., an off-site office, etc.). The augmented reality system is preferably calibrated to an existing hardscape, via at least two hardscape control points corresponding to existing points in the model. The system also includes the capabilities to manually adjust global coordinates of the model by the user.

The system also preferably includes auto-clash detection configured to alert a user when elements of the virtual model and existing hardscape are in conflict. Also, the system includes an operator interface which allows the operator to place or view informational tags placed upon, and associated with, objects located in the model or existing hardscape elements in real time.

The operator interface preferably provides properties of items contained in the model (e.g., materials, sizes, thicknesses, etc.) in real time. The system also includes the capabilities for the operator to modify the model in real-time, depending upon site conditions. The system also preferably includes the capabilities to measure relative distances between objects in the model and, in reality, via the user interface as well as distances between two objects in the model or two existing objects.

Further, the system preferably includes the capabilities for the operator to mark items contained within the model as 'completed' during construction phases (i.e., installed items that were previously in the model). The items may be transferred from the model into the existing hardscape via the user interface or by the remote connection. Additionally, the system includes a model that is separable into different layers such that the user is able to view selected types of facilities contained within the model and sections of the model (e.g., pipes, concrete, walls, pumps, etc.). The model may also be split into sections, such that each section includes less data that the entire model as a whole.

According to another embodiment, a method of using an augmented reality application system is also disclosed herein. The method of using an augmented reality application system includes a first step, providing an augmented reality application system; a second step, providing a three-dimensional model uploadable to the augmented reality application system; a third step, uploading the three-dimensional model to the augmented reality application system; a fourth step, calibrating the augmented reality application to at least one control point; a fifth step, viewing the three-dimensional model and an existing hardscape simultaneously via the augmented reality application system; and a sixth step, transferring data related to the three-dimensional model and the existing hardscape to a remote party.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an augmented reality application system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to placing generated data in a real scene and more particularly to an augmented reality application system and method as used to improve the use of a virtual model coupled with existing hardscape to improve construction techniques, improvements, and assembly.

Generally, an augmented reality application system, which may be referred to as "HoloLive" or "MobiLive". As such, the purpose of HoloLive/MobiLive is to provide a "HoloLens" and mobile device application that uses augmented reality (i.e., mixed reality) to allow users to visualize three-dimensional models at a remote location such as a jobsite, worksite, field, or open space on an accurate and globally calibrated location by using a mobile device.

This allows the user(s) to experience a mixed reality of a computer-generated design model compared to existing conditions to find conflicts and issues such as clash and interaction of the design versus reality. The users may be on site or at remote locations. The user(s) can then communicate more effectively with others is the three-dimensional world. The users may be artists, architects, construction groups, oil and gas plant designers, installers, and those that work with a three-dimensional model.

Referring now more specifically to the drawings by numerals of reference, there is shown in FIGS. 1-10, various views of augmented reality application system 100.

Figure 1:
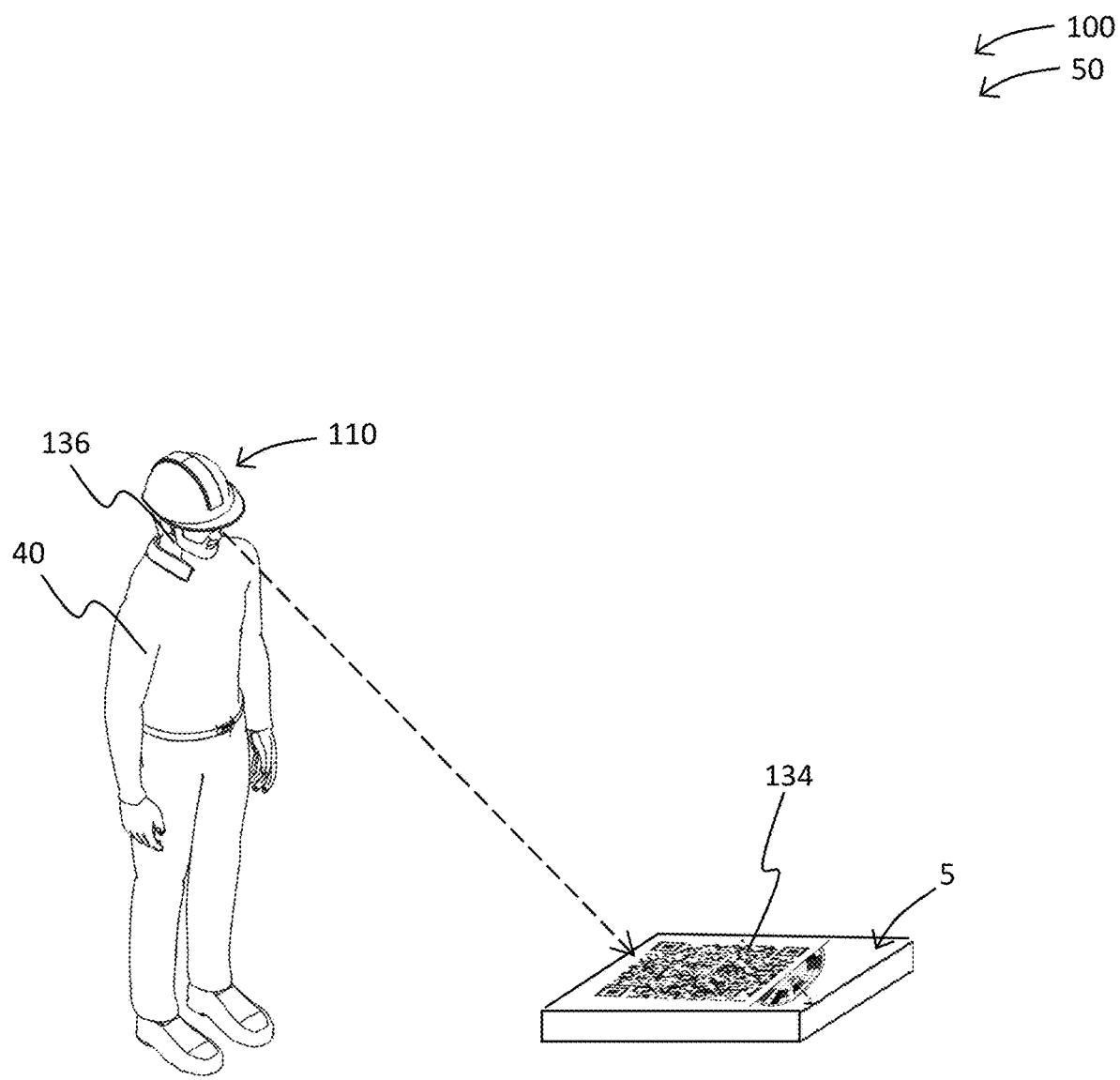
FIG. 1 is a perspective view of the augmented reality application system during an 'in-use' condition, according to an embodiment of the disclosure.
Figure 2:
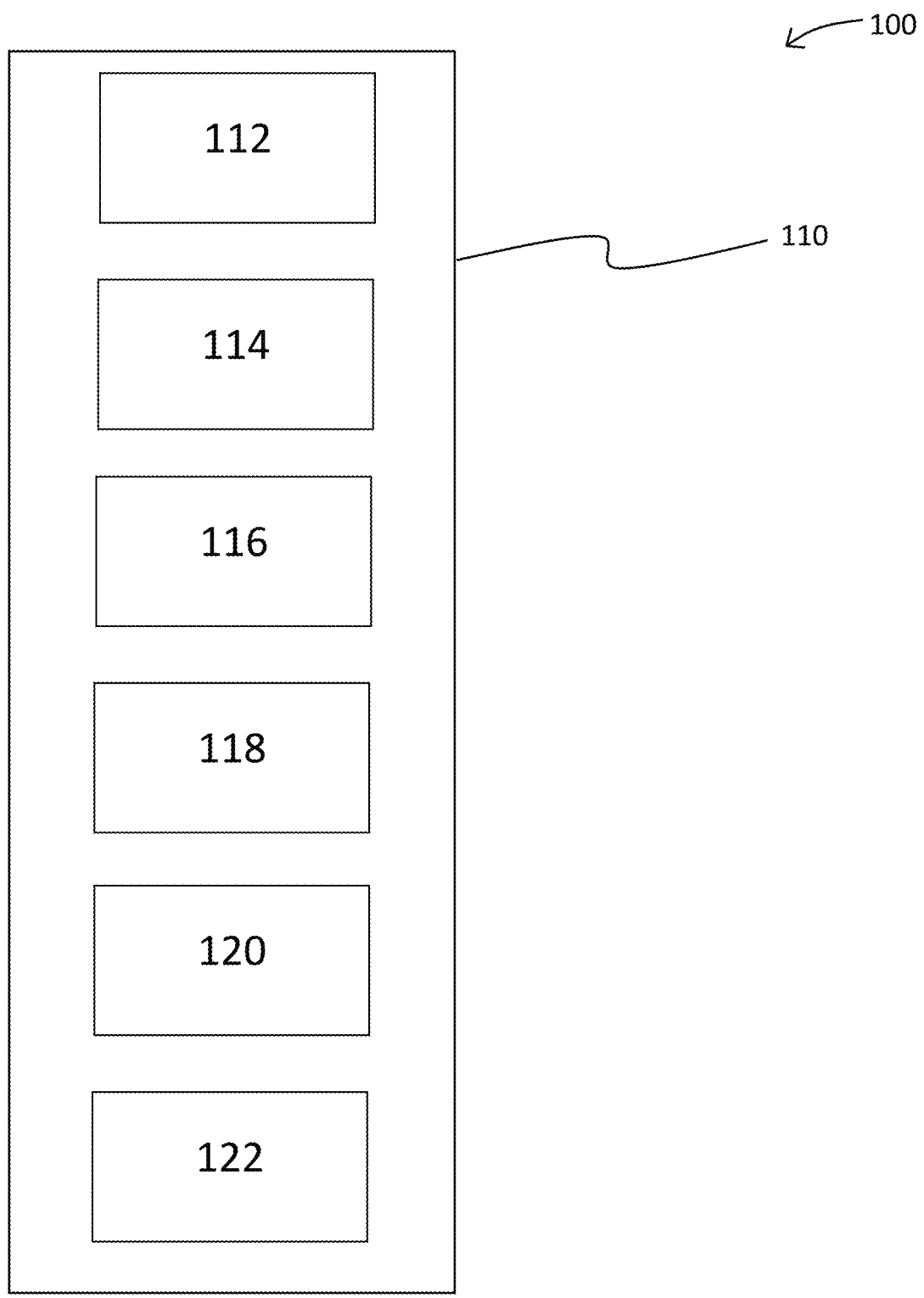
FIG. 2 is a diagram of the components of the augmented reality application system of FIG. 1, according to an embodiment of the present disclosure.

FIGS. 1-10 show augmented reality application system during 'in-use' condition 50, according to an embodiment of the present disclosure. Here, augmented reality application system 100 may be beneficial for use by a user 40 to view both a virtual model 124 as well as existing hardscape 5 together, and in real-time. As illustrated, augmented reality application system 100 may include wireless device 110 with embedded components and software. As such wireless device 110 may include remote connection 112, internal memory 114, at least one gyroscopic sensor 116, camera 118, visual output 120, and global positioning unit 122 (as shown in FIG. 2). Augmented reality application system 100 may be configured to allow user 40 to view a three-dimensional model 124 as well as existing hardscape 5 simultaneously, and in real-time. Those with ordinary skill in the art will now appreciate that upon reading this specification and by their understanding the art of virtual reality, augmented reality, and three-dimensional modeling as described herein, methods of using an augmented reality application system will be understood by those knowledgeable in such art.

Figure 9:
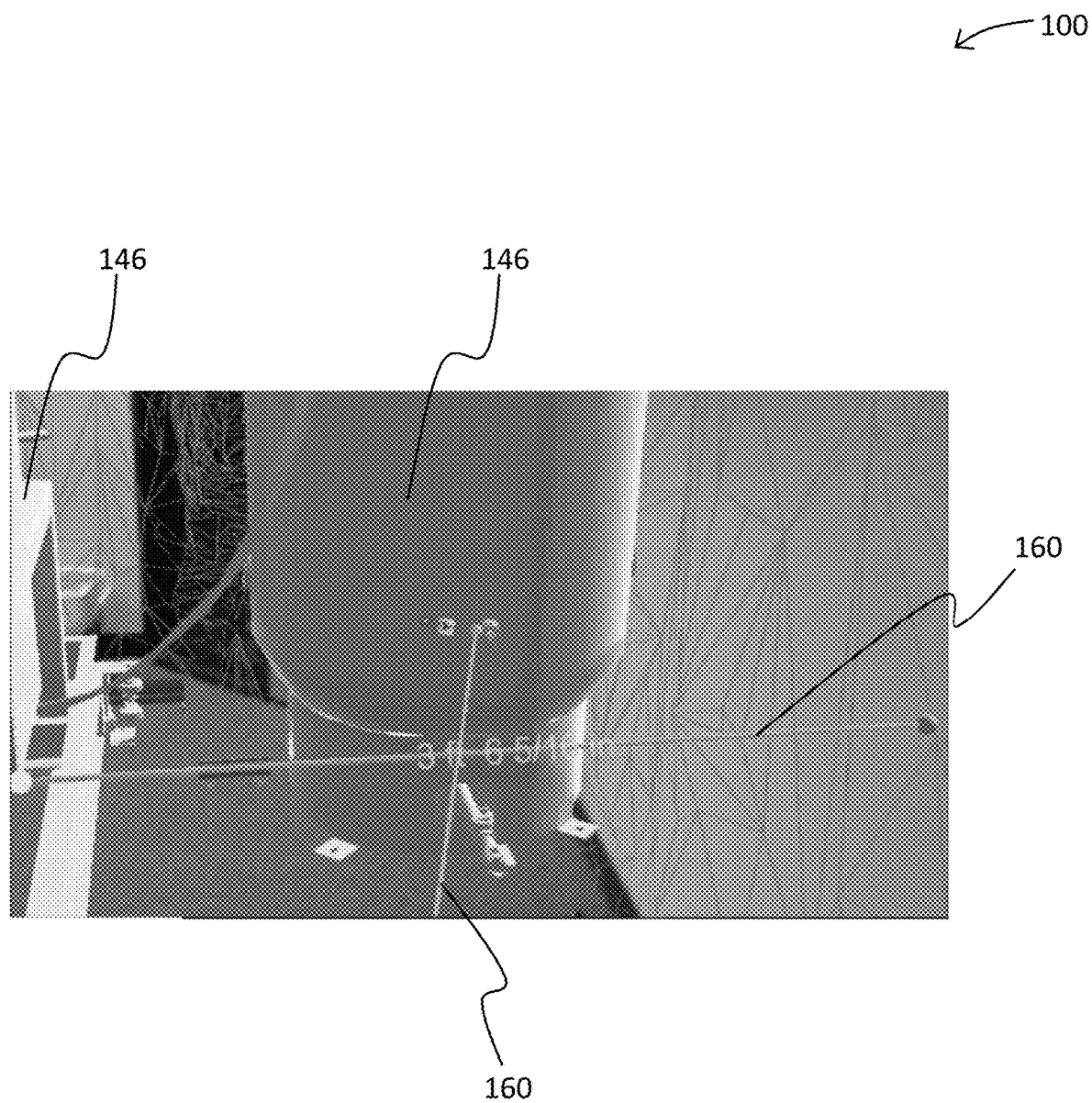
FIG. 9 is a perspective view of the augmented reality application system of FIG. 1, including measurement capabilities according to an embodiment of the present disclosure.
Figure 10:
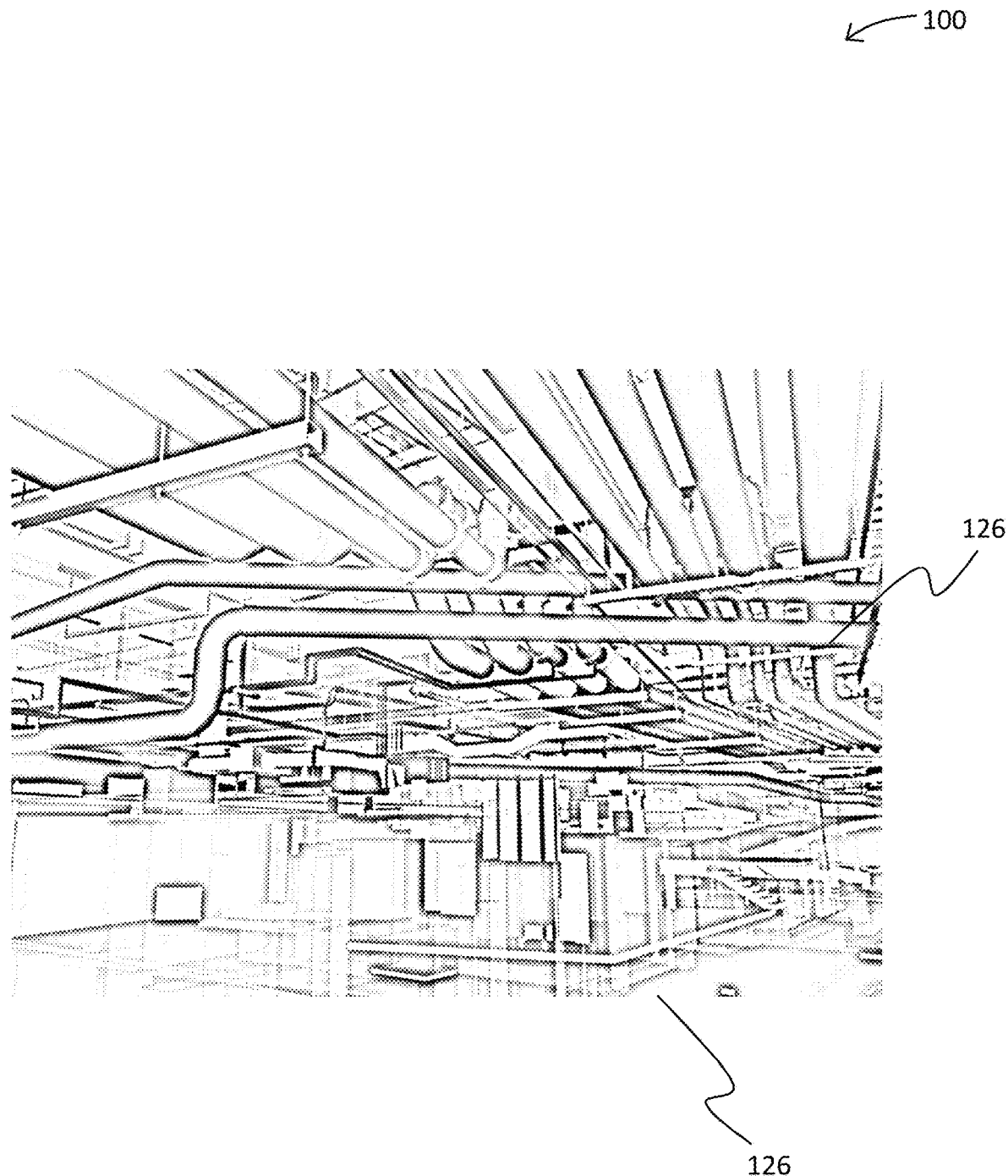
FIG. 10 is perspective view of the layers of the augmented reality application system of FIG. 1, according to an embodiment of the present disclosure.

Augmented reality application system 100 may include model 124 that is separable into different layers 126 (FIG. 10) such that user 40 is able to view selected types of facilities and items 146 contained within model 124 as well as sections 156 (FIG. 8) of model 124. Augmented reality application system 100 may include the capabilities to measure relative distances 160 between objects in model 124 and the reality versus hardscape 5 (as shown in FIG. 9).

Internal memory 114 may include three-dimensional model 124 related to a construction design. Augmented reality system 100 may be calibrated to existing hardscape 5. As such, augmented reality system 100 may include wireless device 110 that includes the capabilities to read a data-marker. Also, at least one gyroscopic sensor 116 may include capabilities to determine a vertical axis and a horizontal axis. Further, augmented reality application system 100 may include the capabilities for operator/user 40 to mark items contained within model 124 as completed during construction phases. Augmented reality application system 100 may include the capabilities for operator/user 40 to modify model 124 in real-time. Also, augmented reality application system 100 may include the capabilities to take screen-shots.

Figure 3:
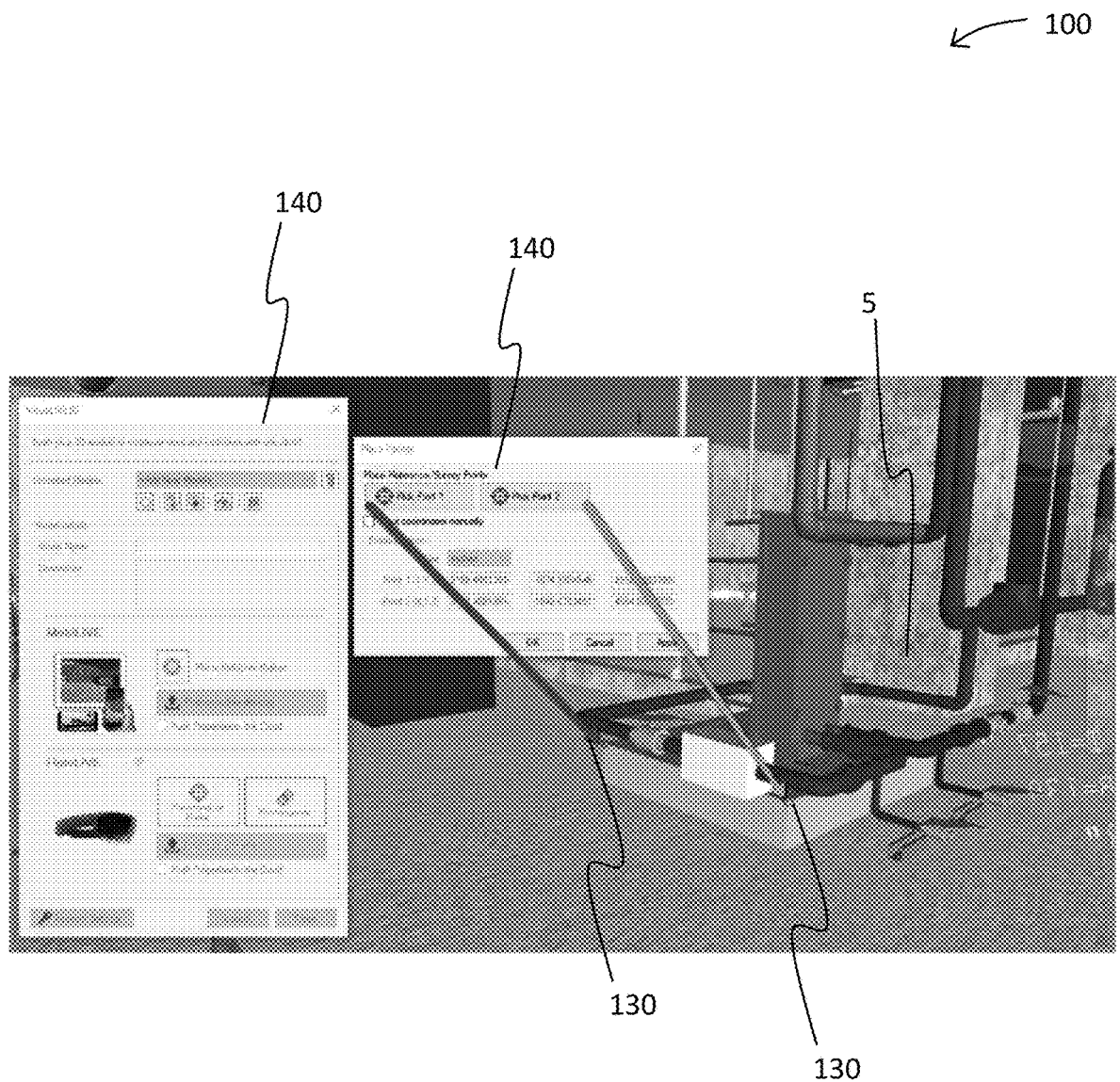
FIG. 3 is a view of the augmented reality application system during an 'in-use' condition illustrating the control points and calibration of the augmented reality application system of FIG. 1, according to an embodiment of the present disclosure.
Figure 4:
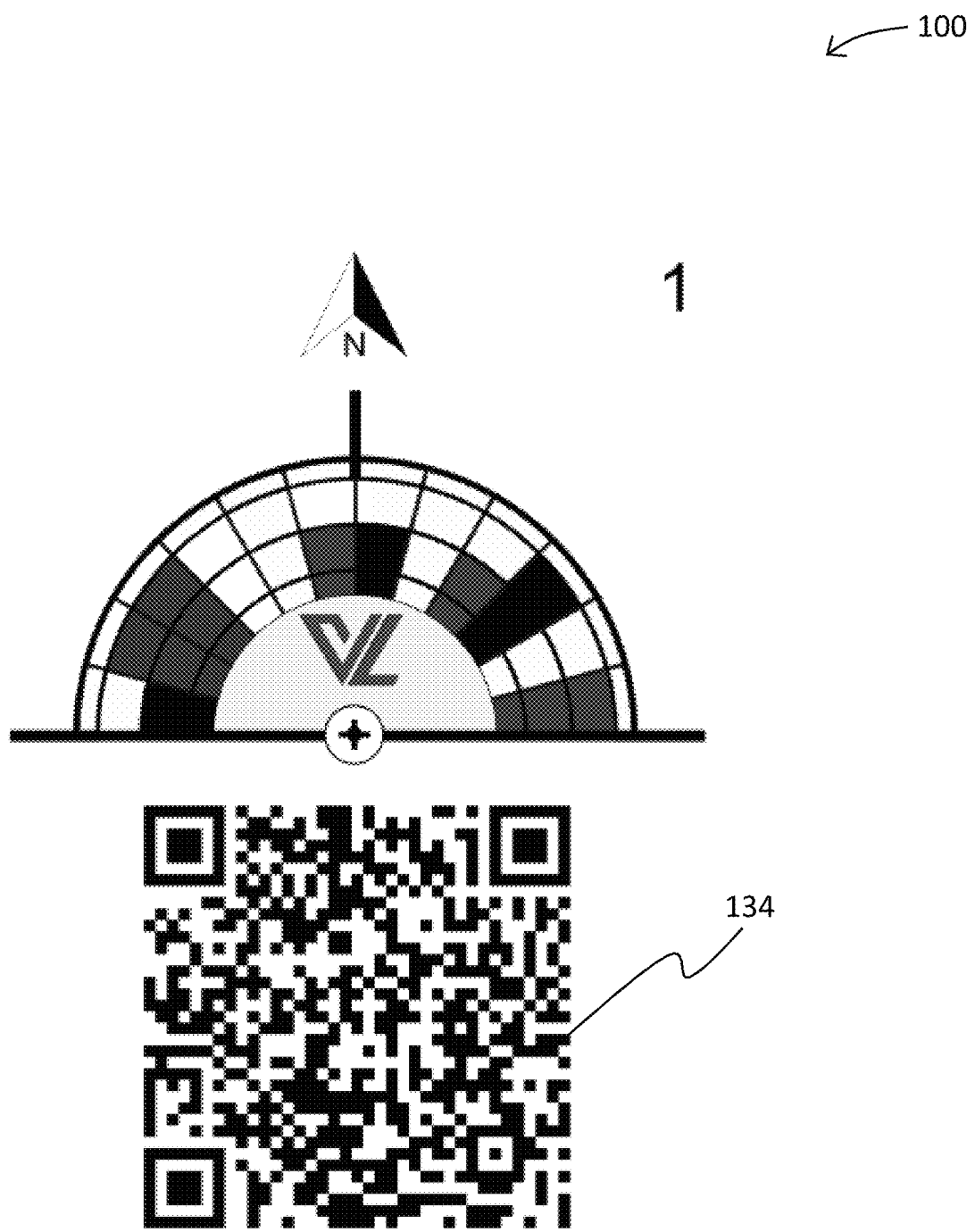
FIG. 4 is a view of the quick response code marker and compass of the augmented reality application system used for calibration of FIG. 1, according to an embodiment of the present disclosure.
Figure 5:
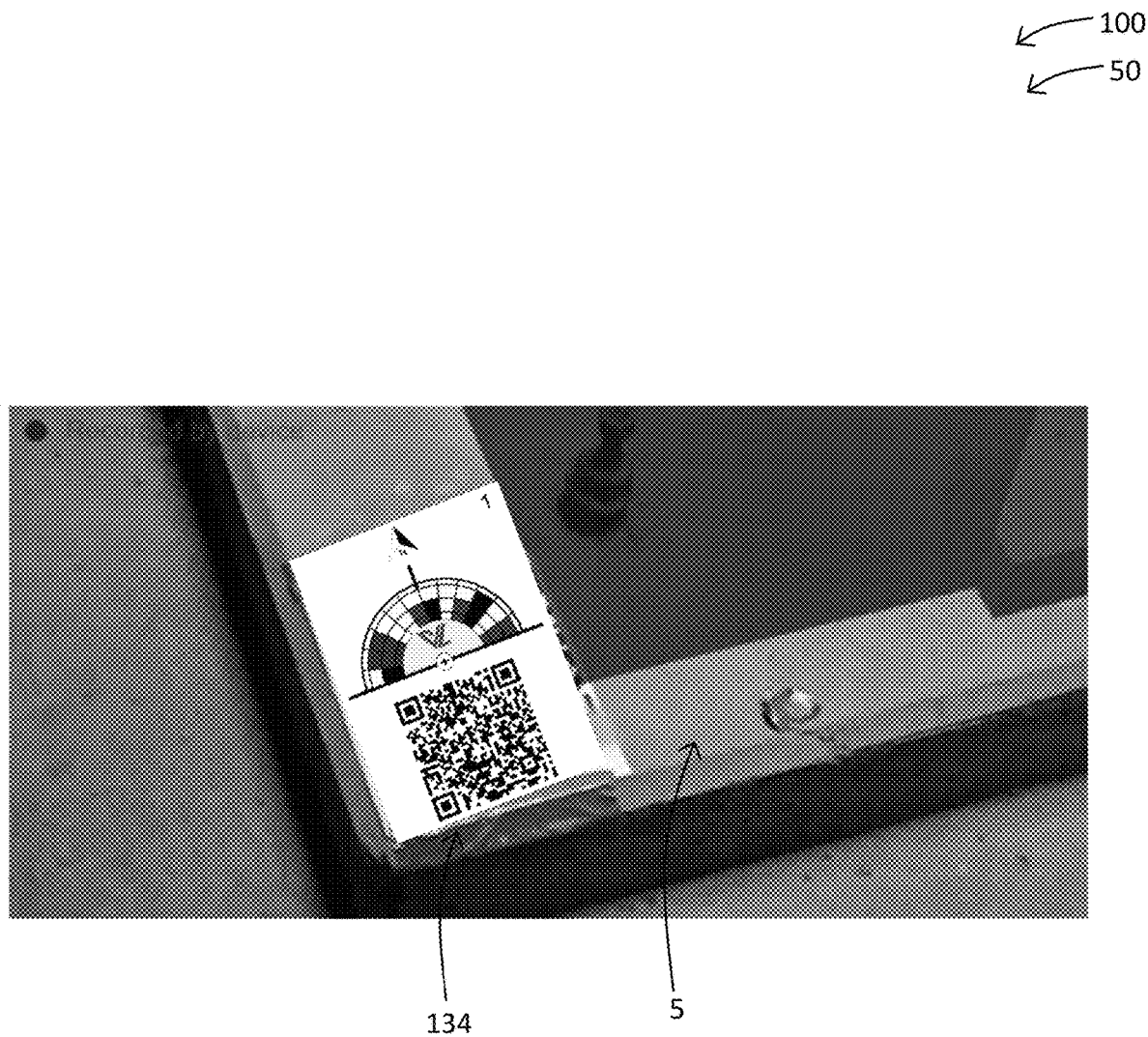
FIG. 5 is an additional view of the quick response code marker and compass of the augmented reality application system of FIG. 1, according to an embodiment of the present disclosure.
Figure 6:
FIG. 6 is a view of the survey monument for calibration of the augmented reality application system of FIG. 1, according to an embodiment of the present disclosure.

In embodiments, augmented reality application system 100 may be calibrated to at least two hardscape control points 130 corresponding to existing points in model 124, as depicted in FIG. 3. Other embodiments may include augmented reality application system 100 calibrated by quick response code marker 134, including a "visual live marker" (which may appear as a compass-like element) adjacent, above, or below the quick response code marker 134, as shown in FIGS. 1, 4, 5, and 7. The compass (e.g., including "visual live marker") may point to any angle, including north, or any such geographic bearing, in embodiments. Further, the compass/"visual live marker" may include additional information, such as, but not limited to, bearing, heading, etc. Alternate embodiments may include augmented reality application system 100 calibrated by at least one survey monument 130 (FIG. 6) and gyroscope 116. Augmented reality application system 100 may include capabilities to manually adjust global coordinates of model 124.

Also, augmented reality application system 100 may be operable via dedicated headset 136. Further, system 100 may be operable upon a mobile cellular device 110 and system 100 may include the capabilities to transmit data to a third party.

Figure 7:
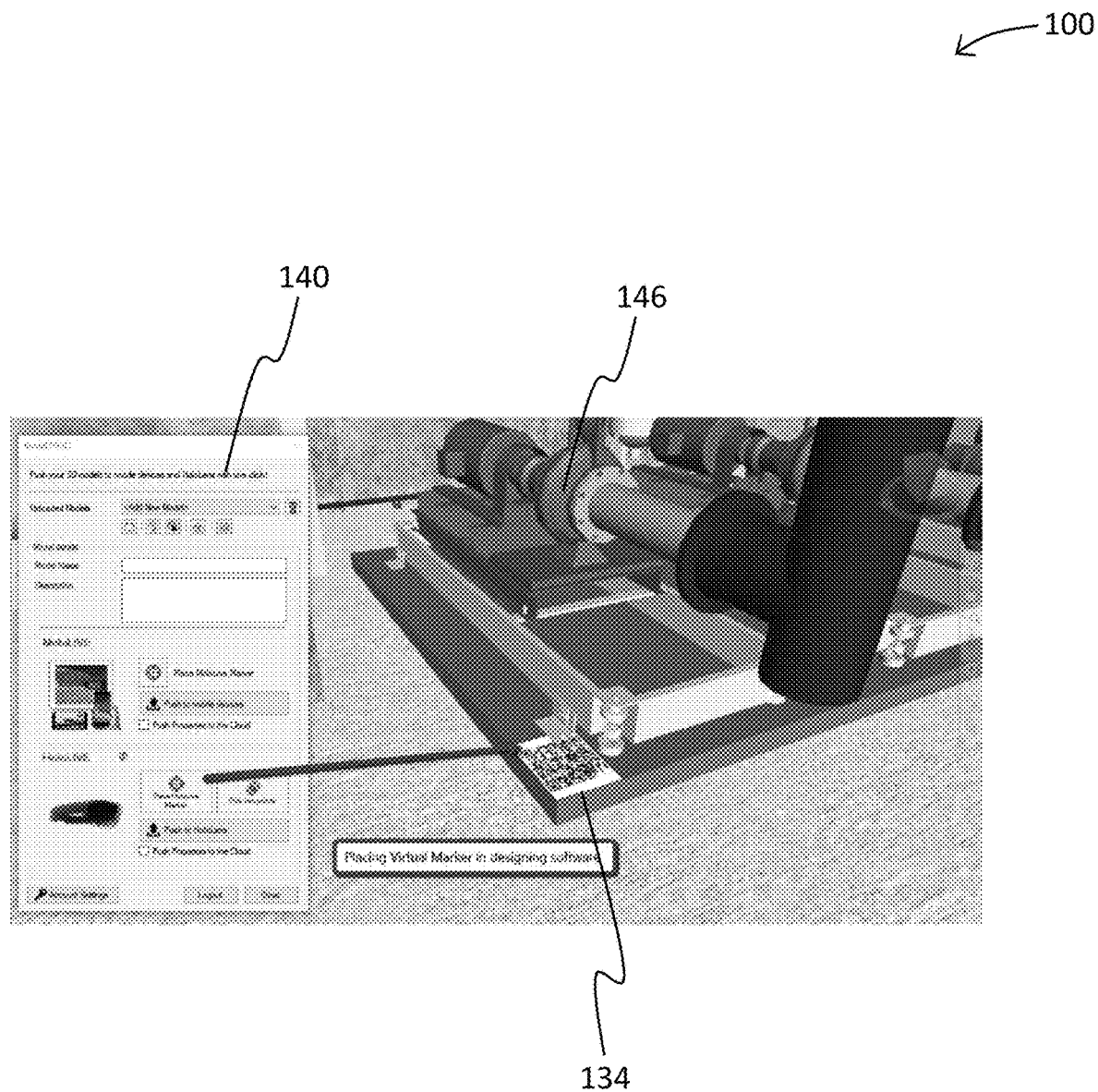
FIG. 7 is a view of the quick response code marker and compass of the augmented reality application system of FIG. 1, according to an embodiment of the present disclosure.
Figure 8:
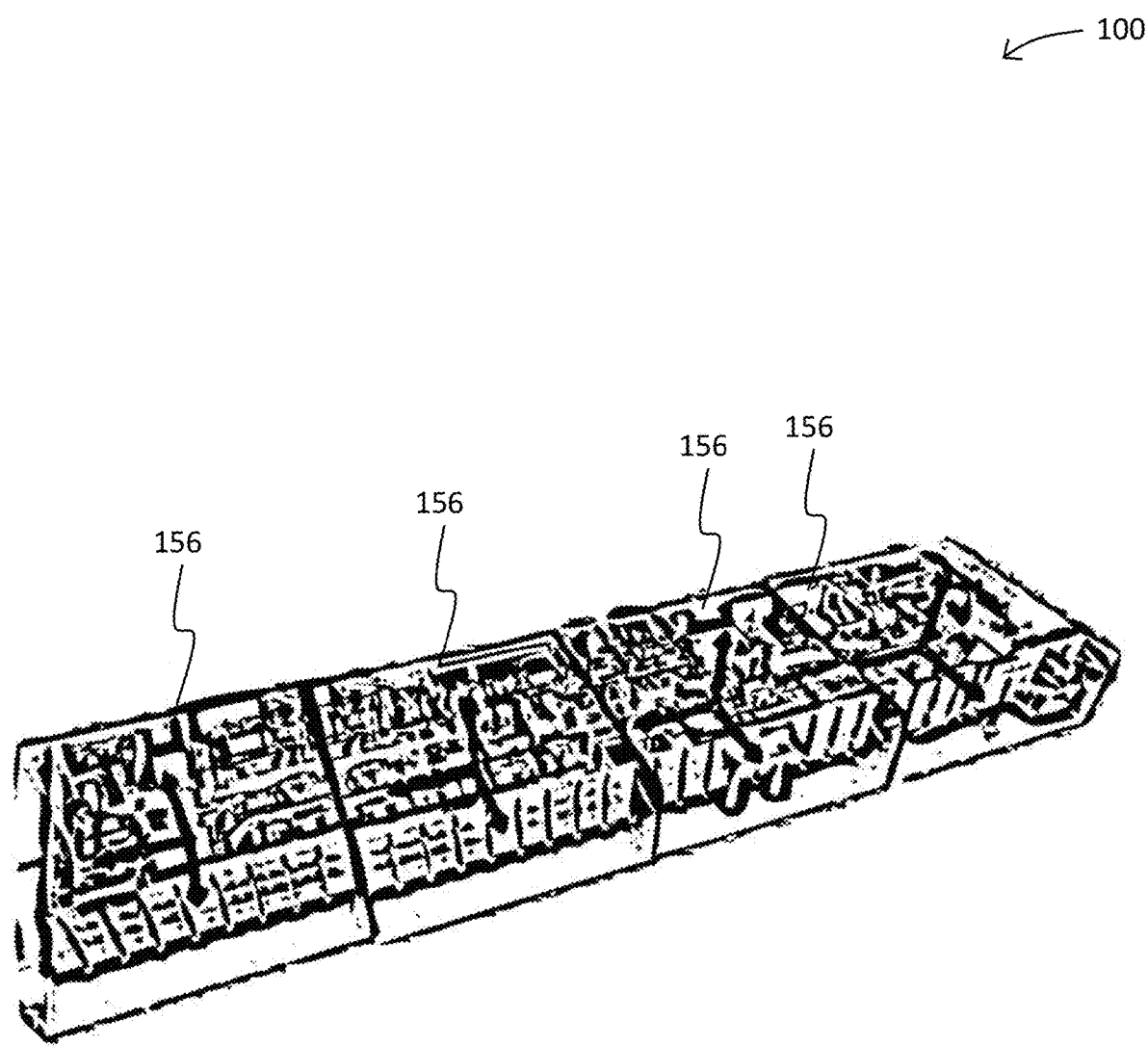
FIG. 8 is a perspective view of the sections of the augmented reality application system of FIG. 1, according to an embodiment of the present disclosure.

Augmented reality application system 100 may include auto-clash detection, configured to alert user 40 when elements of virtual model 124 and existing hardscape 5 are in conflict. As shown in FIG. 7, augmented reality application system 100 may include operator interface 140 which allows operator/user 40 to place informational tags upon objects located in model 124 or existing hardscape 5. Augmented reality application system 100 may include operator interface 140 which provides properties of items 146 contained in model 124. Additionally, the system 100 may include the capability to take screen-shots which may include global coordinate data.

Upon reading this specification, it should be appreciated that, under appropriate circumstances, considering such issues as user preferences, design preference, structural requirements, marketing preferences, cost, available materials, technological advances, etc., other software and hardware arrangements such as, for example, alternate computing devices, etc., may be sufficient.

According to one embodiment, the augmented reality application system 100 may be arranged as a kit 105. In particular, augmented reality application system 100 may further include a set of instructions 107. Instructions 107 may detail functional relationships in relation to the structure of augmented reality application system 100 such that augmented reality application system 100 can be used, maintained, or the like, in a preferred manner.

Figure 11:
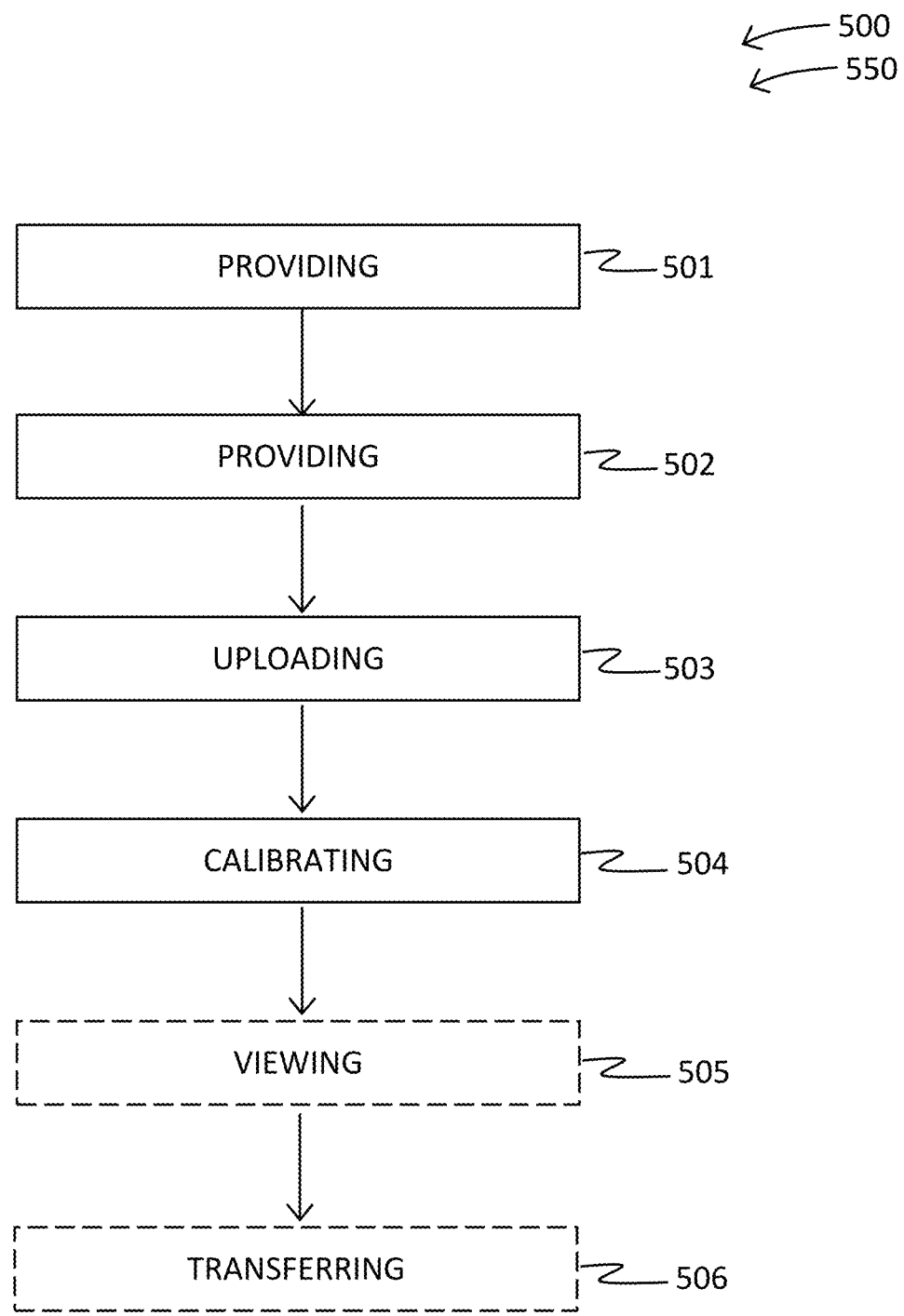
FIG. 11 is a flow diagram illustrating a method of using an augmented reality application, according to an embodiment of the present disclosure.

FIG. 11 is a flow diagram illustrating method of using an augmented reality application system 500, according to an embodiment of the present disclosure. In particular, method of using augmented reality application system 500 may include one or more components or features of augmented reality application system 100 as described above. As illustrated, method of using augmented reality application system 500 may include the steps of: step one 501, providing augmented reality application system 100; step two 502, providing a three-dimensional model 124 uploadable to augmented reality application system 100; step three 503, uploading the three-dimensional model 124 to augmented reality application system 100; step four 504, calibrating augmented reality application system 100 to at least one control point 130; step five, viewing three-dimensional model 124 and existing hardscape 5 simultaneously via augmented reality application system 100; and step six, transferring data related to the three-dimensional model 124 and existing hardscape 5 to a remote party.

It should be noted that step five 505 and step six 506 are optional steps and may not be implemented in all cases. Optional steps of method of use 500 are illustrated using dotted lines in FIG. 11 so as to distinguish them from the other steps of method of use 500. It should also be noted that the steps described in the method of use can be carried out in many different orders according to user preference.

The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for method of using an augmented reality application system (NOTE: e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An augmented reality application system comprising:
   a wireless device including a remote connection, an internal memory, at least one gyroscopic sensor, a camera, a visual output, and a global positioning unit;
   wherein said internal memory includes a three-dimensional model related to a construction design;
   wherein said at least one gyroscopic sensor includes capabilities to determine a vertical axis and a horizontal axis;
   wherein said augmented reality system is calibrated to an existing hardscape;
   wherein said wireless device includes the capabilities to read a data-marker;

wherein said augmented reality system is configured to allow a user to real-time views of said three-dimensional model and an existing hardscape simultaneously; and wherein said model is separable into different layers such that said user is able to view selected types of facilities contained within said model and sections of said model.

2. The system of claim 1, wherein said system is calibrated via a marker that includes a quick response code marker and a visual live marker.

3. The system of claim 1, wherein said system is calibrated via at least two hardscape control points corresponding to existing points in said model.

4. The system of claim 1, wherein said system is calibrated via at least one survey monument and said gyroscope.

5. The system of claim 1, wherein said system is operable via a dedicated headset.

6. The system of claim 1, wherein said system is operable upon a mobile device.

7. The system of claim 1, wherein said system includes the capabilities to transmit data to a third party.

8. The system of claim 1, wherein said system includes auto-clash detection configured to alert a user when elements of said virtual model and existing hardscape are in conflict.

9. The system of claim 1, wherein said system includes an operator interface which allows said operator to place and view informational tags upon objects.

10. The system of claim 1, wherein said system includes an operator interface which displays properties of items.

11. The system of claim 1, wherein said system includes the capabilities for said operator to mark items contained within said model as completed during construction phases.

12. The system of claim 1, wherein said system includes the capabilities for said operator to modify said model in real-time.

13. The system of claim 1, wherein said system includes the capabilities to take screen-shots and record corresponding global coordinate data.

14. The system of claim 1, wherein said system includes the capabilities to manually adjust global coordinates of said model.

15. The system of claim 1, wherein said system includes the capabilities to measure relative distances between objects in said model and said reality.

16. An augmented reality application system, the system comprising:
    a wireless device, said wireless device including a remote connection, an internal memory, at least one gyroscopic sensor, a camera, a visual output, and a global positioning unit;
    wherein said internal memory includes a three-dimensional model related to a construction design;
    wherein said at least one gyroscopic sensor includes capabilities to determine a vertical axis and a horizontal axis;
    wherein said augmented reality system is calibrated to an existing hardscape;
    wherein said wireless device includes the capabilities to read a data-marker;
    wherein said augmented reality system is configured to allow a user to view said three-dimensional model as well as an existing hardscape simultaneously and in real-time;
    wherein said system includes the capabilities to transmit data to a third party;
    wherein said system includes auto-clash detection configured to alert a user when elements of said virtual model and existing hardscape are in conflict;
    wherein said system includes an operator interface which allows said operator to place informational tags upon objects;
    wherein said system includes an operator interface which provides properties of items contained in said model;
    wherein said system includes the capabilities for said operator to mark items contained within said model as completed during construction phases;
    wherein said system includes the capabilities for said operator to modify said model in real-time;
    wherein said system includes the capabilities to manually adjust global coordinates of said model;
    wherein said system includes said model that is separable into different layers such that said user is able to view selected types of facilities contained within said model and sections of said model; and
    wherein said system includes the capabilities to measure relative distances between objects in said model and said reality.

17. The system of claim 16, further comprising set of instructions; and
    wherein said system is arranged as a kit.

* * * * *